United States Patent [19]

Butler et al.

[11] Patent Number: 5,997,727
[45] Date of Patent: Dec. 7, 1999

[54] DEWAXING WITH NICKEL-SILICALITE CATALYST

[75] Inventors: James R. Butler; Cleve Forward, both of Houston, Tex.

[73] Assignee: Fina Technology, Inc., Dallas, Tex.

[21] Appl. No.: 09/177,677

[22] Filed: Oct. 22, 1998

Related U.S. Application Data

[63] Continuation of application No. 08/869,608, Jun. 6, 1997, abandoned, which is a continuation of application No. 08/561,574, Nov. 21, 1995, abandoned.

[51] Int. Cl.⁶ .................................................. C10G 11/02
[52] U.S. Cl. ............................. 208/118; 208/28; 208/111
[58] Field of Search ............................. 208/118, 28, 111

[56] References Cited

U.S. PATENT DOCUMENTS

| | | | |
|---|---|---|---|
| 4,061,724 | 12/1977 | Grose et al. | 423/335 |
| 4,309,175 | 1/1982 | Mulaskey | 208/109 |
| 4,657,662 | 4/1987 | Valysik | 208/111 |
| 4,842,717 | 6/1989 | Grootjans et al. | 208/118 |
| 4,960,504 | 10/1990 | Pellet | 208/411 |

*Primary Examiner*—Helane Myers
*Attorney, Agent, or Firm*—Michael J. Caddell; William D. Jackson; M. Norwood Cheairs

[57] ABSTRACT

A process for dewaxing middle distillate petroleum products includes the steps of introducing a middle distillate petroleum fraction having a boiling point in the range of from about 160° C. to about 500° C. into a reaction zone and contacting the middle distillate petroleum fraction in the reaction zone at temperatures of from about 500° F. To about 700° F. And pressures of from about 300 psig to about 2000 psig with a nickel-containing silicate catalyst.

22 Claims, No Drawings

DEWAXING WITH NICKEL-SILICALITE CATALYST

This application is a continuation of application Ser. No. 08/869,608 filed Jun. 6, 1997, which in turn is a continuation of application Ser. No. 08/561,574 filed Nov. 21, 1995 now abandoned.

TECHNICAL FIELD

The present invention relates to a process for dewaxing middle distillate petroleum streams such as diesel and kerosene utilizing a nickel impregnated silicate catalyst.

BACKGROUND OF THE INVENTION

Many petroleum middle distillate streams, particularly middle distillate streams produced from medium or severe hydrocracking operations, require dewaxing to provide the desired properties. Dewaxing involves the conversion of higher molecular weight straight and branched chain paraffins to lower molecular weight compounds.

Conventional dewaxing processes for middle distillate fractions require temperatures in excess of about 700° F., typically in the range of from about 710° F. to about 750° F. (376° C. to 398° C.). Heating a middle distillate stream to this temperature range consumes a considerable amount of energy and requires substantial investment in process equipment. Thus, it would be desirable to reduce the amount of energy consumed and the amount of process equipment required to effectively dewax a typical middle distillate stream. The process of the present invention provides a method of dewaxing a middle distillate stream at lower than conventional temperatures, down to as low as about 500° F. Preferably, the dewaxing process of the present invention is practiced in the range of from about 500° F. to about 700° F. Dewaxing at these temperatures is achieved by utilizing a nickel-impregnated silicate catalyst.

SUMMARY OF THE INVENTION

The present invention provides a method for dewaxing middle distillate petroleum products such as diesel, kerosene and light cycle oil utilizing a nickel impregnated silicate catalyst. The use of the catalyst permits the dewaxing operation to be conducted at lower temperatures than conventionally used to dew ax middle distillate streams. The Si/Al ratio of the silicate utilized in the process of the present invention is greater than 200 and the catalyst contains from about 0.1% to about 5% nickel. The use of the catalyst permits dewaxing at temperatures that allow the dewaxing process to be accomplished in one or more beds of a multiple bed reactor that may also be used for hydrodesulfrization.

DETAILED DESCRIPTION

The process of the present invention provides an improved method of dewaxing middle distillate petroleum fractions such as diesel, kerosene and light cycle oil (LCO). The term "middle distillate" as used herein refers to petroleum distillate fractions having boiling points in the range of from about 160° C. to about 500° C. These fractions are also characterized as having flash points between about 30° C. and about 80° C. The process utilizes a silicate catalyst that has been impregnated with nickel to dewax middle distillate fractions at temperatures that are lower than those used in conventional processes.

The catalysts employed in the process of the present invention can be described as crystalline microporous organosilicates that are prepared hydrothermally with a reaction mixture including tetraethylamrnmonium cations, alkali metal cations, water and a reactive source of silica. In contrast to crystalline zeolite materials which are aluminosilicates comprising three dimensional $SiO4$ and $AlO_4$ tetrahedra joined by shared oxygen atoms, the silicate crystalline organosilicates utilized in the process of the present invention are prepared from reaction systems which are essentially free of aluminum-containing reagents. Any aluminum present in the silicate crystalline organosilicates is the result of impurities contained in the materials used to prepare the silicalites. Preferably, the Si/Al ratio of the silicate utilized in the process of the present invention is greater than 200, more preferably the Si/Al ratio is in the range of from about 250 to about 500. The silicalites used in the process of the present invention may be prepared in accordance with the methods set forth in U.S. Pat. No. 4,061,724, the disclosure of which is incorporated herein by reference for all purposes.

After preparation, the silicalites catalyst may be dispersed in a binder or support material such -as alumina. The silicate binder admixture may be formed into the desired shape by extrusion, pelletization or other techniques known to those skilled in the art.

After the silicate binder admixture has been formed, it is impregnated with nickel, preferably in the form of an aqueous solution of a nickel salt. Methods of impregnating the silicate catalyst with nickel are known to those skilled in the art. One method involves forming solutions of a nickel containing compound such as nickel nitrate or nickel acetate and then contacting the silicate catalyst with the solution. The catalyst is contacted with a sufficient amount of the solution to deposit appropriate amounts of nickel or nickel salts onto the silicate catalyst. Preferably, the silicate catalyst is contacted with a sufficient amount of the solution to impregnate the catalyst with from about 0.1 wt % to about 5 wt % nickel. More preferably, the catalyst is impregnated with from about 0.5 wt % to about 1.5 wt % nickel. After the catalyst has been impregnated with the desired amount of nickel, the catalyst may be calcined.

The nickel impregnated or nickel-containing silicate catalyst prepared in accordance with the foregoing may be advantageously utilized to dew ax middle distillate petroleum products. In one embodiment of the process of the present invention, the nickel impregnated silicate catalyst is prepared as a one-sixteenth inch diameter extrudate and is characterized by a crystallite particle size in the range of from about 1 to 2 $\mu$m. The catalyst has a Si/Al ratio of about 300 and contains about 1% nickel.

The process of the present invention can be carried out using a variety of process equipment, including a reactor vessel which defines a reaction zone containing catalyst material. Either single or multiple catalyst beds may be employed in the reaction zone. The dewaxing process of the present invention may be conducted at pressures of from about 300 psig to about 2000 psig, preferably from about 400 psig to about 1000 psig. Liquid hourly space velocities may range from about 0.1 $hr^{-1}$ to about 30 $hr^{-1}$, more preferably from about 1 $hr^{-1}$ to about 8 $hr^{-1}$. Hydrogen may be injected as needed depending on the particular feedstock to the dewaxing reactor. Normally hydrogen will be injected at a rate in the range of from 300 to 2000 SCFB (Standard Cubic Feet per Barrel) of feedstock. As noted above, the dewaxing process may be operated at temperatures ranging from about 500° F. to about 1050° F., and more preferably in the range of from about 550° F. to about 700° F.

In another embodiment of the invention, the nickel-impregnated silicate catalyst is used in one or more beds of a multiple bed reactor that also contain a catalyst suitable for hydrodesulfirization. The combination of dewaxing and hydrodesulfirization in a single multiple bed reactor is possible because the nickel-impregnated silicate catalyst is effective in dewaxing within the same temperature range that hydrodesulfirization is accomplished.

The process of the present invention may be further illustrated by the following example which is not to be construed as limiting the scope of the invention as hereinafter claimed.

EXAMPLE

Approximately 36 milliliters of a silicate catalyst impregnated with approximately 1% nickel is introduced into a laboratory scale reactor. The catalyst has a particle size distribution of between 40 and 60 mesh. Nitrogen is introduced into the reactor and temperature is increased to about 115° C. at a rate of about 50° C. per hour. The temperature is maintained at this level for a period of from about 3 to 4 hours and then increased to about 150° C. The reactor is then placed under hydrogen flow for about ten to fifteen hours after which the reactor temperature is increased to about 250° C.

A feed stream comprising a mixture of 52% straight run distillate, 16% kerosene and 20% light cycle oil is introduced into the reactor at a rate of 3.00 milliters per min lute, corresponding to a liquid hourly space velocity of 5.0 hr$^{-1}$. Hydrogen is fed to the reactor at a rate of 0.266 liters/min. And the reactor pressure is maintained between 430 and 450 psig. The reactor feed stream is characterized in Table 1 below:

TABLE 1

REACTOR FEED

| | |
|---|---|
| API Gravity: | 32.6 |
| Color: | 1.5 |
| Sulfur wt %: | 0.815 |
| Flash Point: | 190° F. |
| Pour Point: | 20° F. |
| Cloud Point: | 26° F. |
| Initial Boiling Point: | 386° F. |
| Centane Index: | 48.6 |
| H$_2$/Distillate Ratio: | 500 SCFB (Standard Cubic Feet per Barrel) |

The test is conducted for 600 hours and the reactor effluent is periodically sampled and analyzed for pour point and cloud point. Reactor inlet and outlet temperatures along with the reactor effluent pour point and cloud point are set forth below:

TABLE 2

| Test Duration (hours) | Reactor Inlet | Temp (° C.) Outlet | Pour Point (° F.) | Cloud Point (° F.) |
|---|---|---|---|---|
| 2 | 252 | 253 | 0 | 18 |
| 22 | 262 | 264 | 20 | 22 |
| 29 | 285 | 286 | 10 | 13 |
| 46 | 286 | 287 | 10 | 17 |
| 70 | 290 | 292 | 10 | 17 |
| 94 | 295 | 296 | 5 | 12 |
| 103 | 303 | 305 | 10 | 15 |
| 118 | 303 | 305 | 10 | 16 |
| 126 | 315 | 318 | 5 | 11 |
| 142 | 312 | 315 | 10 | 15 |

TABLE 2-continued

| Test Duration (hours) | Reactor Inlet | Temp (° C.) Outlet | Pour Point (° F.) | Cloud Point (° F.) |
|---|---|---|---|---|
| 150 | 317 | 321 | 10 | 14 |
| 167 | 316 | 319 | 5 | 16 |
| 175 | 318 | 320 | 5 | 16 |
| 192 | 315 | 318 | 15 | 22 |
| 200 | 321 | 324 | 10 | 15 |
| 218 | 320 | 323 | 10 | 16 |
| 241 | 328 | 330 | 10 | 13 |
| 265 | 327 | 329 | 10 | 14 |
| 289 | 330 | 332 | 10 | 14 |
| 321 | 328 | 331 | 10 | 11 |
| 336 | 328 | 331 | 10 | 13 |
| 360 | 328 | 334 | 10 | 16 |
| 365 | 329 | 332 | 10 | 12 |
| 384 | 329 | 331 | 15 | 16 |
| 408 | 334 | 336 | 10 | 15 |
| 432 | 336 | 338 | 5 | 15 |
| 439 | 340 | 342 | 5 | 10 |
| 456 | 340 | 342 | 5 | 14 |
| 480 | 338 | 340 | 10 | 16 |
| 504 | 339 | 342 | 10 | 17 |
| 511 | 342 | 344 | 10 | 12 |
| 552 | 344 | 345 | 10 | 15 |
| 578 | 346 | 348 | 10 | 16 |
| 600 | 354 | 355 | 0 | 8 |

While the invention has been described in connection with the foregoing example, it will be appreciated by the those skilled in the art that the invention is subject to variations and modifications which fall within the scope of the appended claims and which are intended to be covered thereby.

We claim:

1. A process for dewaxing middle distillate petroleum products comprising:
   introducing a middle distillate petroleum fraction having a boiling point in the range of from about 160° C. to about 500° C. into a reaction zone; and
   dewaxing the middle distillate petroleum fraction in the reaction zone at temperatures of from about 500° F. to about 700° F. in the presence of a nickel-impregnated silicate catalyst, containing from about 0.1 wt % to about 5 wt % nickel, prepared from reaction systems which are essentially free of aluminum-containing reagents to provide a silica/alumina ratio of said silicate greater than 200.

2. The process of claim 1 wherein the nickel impregnated silicate catalyst is essentially free of molybdenum and cobalt.

3. The process of claim 1 wherein the reaction zone is maintained at a pressure of from about 300 psig to about 2000 psig.

4. The processor claim 1 wherein the middle distillate petroleum fraction is selected from the group consisting of diesel, kerosene, light cycle oil and mixtures thereof.

5. The process of claim 1 wherein the reaction zone is operated at liquid hourly space velocities of from about 0.1 hr$^{-1}$ to about 30 hr$^{-1}$.

6. The process of claim 1 wherein the reaction zone further comprises a catalyst suitable for hydrodesuliration of the middle distillate petroleum fraction.

7. The process of claim 1 wherein the nickel containing silicate catalyst is characterized by a crystallite particle size in the range of from about 0.1 to 2 μm.

8. The process of claim 1 wherein hydrogen is introduced into the reaction zone at a rate of from about 300 SCFB to about 2000 SCFB based upon the flow of the middle distillate fraction.

9. the process of claim 1 wherein the middle distillate fraction is dewaxed at a temperature within the range of 550° F.–700° F.

10. A process for dewaxing middle distillate petroleum products comprising:

introducing a middle distillate petroleum fraction having a boiling point in the range of from about 160° C. to about 500° C. into a reaction zone; and dewaxing the middle distillate petroleum fraction in the reaction zone at temperatures of from about 500° F. to about 700° F. in the presence of a nickel-containing silicate catalyst which is essentially free of aluminum, the nickel-containing silicate catalyst comprising from about 0.1% to about 5% nickel; and being prepared from reaction systems which are essentially free of aluminum-containing reagents to provide a silica/alumina ratio of said silicate greater than 200.

11. The process of claim 10 wherein the reaction zone is maintained at a pressure of from about 300 psig to about 2000 psig.

12. The process of claim 10 wherein the middle distillate petroleum fraction is selected from the group consisting of diesel, kerosene, light cycle oil and mixtures thereof.

13. The process of claim 10 wherein the reaction zone is operated at liquid hourly space velocities of from about 0.1 hr$^{-1}$ to about 30 hr$^{-1}$.

14. The process of claim 10 wherein the reaction zone comprises at least one catalyst bed in a multibed reactor, said at least one catalyst bed containing a catalyst suitable for hydrodesulfiffization of middle distillate petroleum fractions.

15. The process of claim 10 wherein the nickel-containing silicate catalyst is characterized by a crystallite particle size in the range of from about 0.1 to 2 μm.

16. The process of claim 10 wherein hydrogen is introduced into the reaction zone at a rate of from about 300 SCFB to about 2000 SCFB based upon the flow of the middle distillate fraction.

17. A process for dewaxing middle distillate petroleum products comprising:

introducing a middle distillate petroleum fraction having a boiling point in the range of from about 160° C. to about 500° C. into a reaction zone; and dewaxing the middle petroleum fraction in the reaction zone at temperatures from about 500° F. to about 700° F. in the presence of a nickel-containing silicate catalyst which has a silica/alumino ratio greater than 200, the nickel-containing silicate catalyst comprising from about 0.1% to about 5% nickel.

18. The process of claim 17 wherein said silicate catalyst comprises from about 0.5 to about 1.5% nickel.

19. The process of claim 18 wherein said silicate catalyst has a silica/alumino ratio within the range of about 250 to about 500.

20. The process of claim 19 wherein the nickel containing silicate catalyst is characterized by a crystallite particle size in the range of from about 0.1 to 2 μm.

21. The process of claim 18 wherein said silicate catalyst comprises about 1% nickel.

22. The process of claim 10 wherein said silicate catalyst comprises from about 0.5 to about 1.5% nickel.

* * * * *

UNITED STATES PATENT AND TRADEMARK OFFICE
CERTIFICATE OF CORRECTION

PATENT NO. : 5,997,727
DATED : December 7, 1999
INVENTOR(S) : James R. Butler and Cleve Forward Page 1 of 5

It is certified that error appears in the above-identified patent and that said Letters Patent is hereby corrected as shown below:

On title page, item 57- Abstract, line 8, replace "silicate" with --silicalite--.

Col. 1, line 13, replace "silicate" with --silicalite

Col. 1, line 37, replace "silicate" with --silicalite--.

Col. 1, line 43, replace "silicate" with --silicalite--.

Col. 1, line 47, replace "silicate" with --silicalite--.

Col. 1, line 52, replace "hydrodesulfrization" with --hydrodesulfurization--.

Col. 1, line 62, replace "silicate" with --silicalite--.

UNITED STATES PATENT AND TRADEMARK OFFICE
CERTIFICATE OF CORRECTION

Page 2 of 5

PATENT NO. : 5,997,727
DATED : December 7, 1999
INVENTOR(S) : James R. Butler and Cleve Forward It is certified that error appears in the above-identified patent and that said Letters Patent is hereby corrected as shown below:

Col. 2, line 2, replace "tetraethylamrnmonium" with --tetraethylammonium--.

Col. 2, line 6, replace "silicate" with --silicalite--.

Col. 2, line 10, replace "silicate" with --silicalite--.

Col. 2, line 13, replace "silicate" with --silicalite--.

Col. 2, line 21, replace "silicalites" with --silicalite--.

Col. 2, line 25, replace "silicate" with --silicalite--.

Col. 2, line 28, replace "silicate" with --silicalite--.

Col. 2, line 31, replace "silicate" with --silicalite--.

Col. 2, line 34, replace "silicate" with --silicalite-- (both occurrences).

Col. 2, line 40, replace "silicate" with --silicalite--.

Col. 2, line 44, replace "silicate" with --silicalite--.

Col. 2, line 67, replace "silicate" with --silicalite--.

UNITED STATES PATENT AND TRADEMARK OFFICE
CERTIFICATE OF CORRECTION

PATENT NO. : 5,997,727  
DATED : December 7, 1999  
INVENTOR(S) : James R. Butler and Cleve Forward It is certified that error appears in the above-identified patent and that said Letters Patent is hereby corrected as shown below:

Col. 3, line 2, replace "hydrodesulfirization" with --hydrodesulfurization--.

Col. 3, line 3, replace "hydrodesulfirization" with --hydrodesulfurization--.

Col. 3, line 4, replace "silicate" with --silicalite--.

Col. 3, line 6, replace "hydrodesulfirization" with --hydrodesulfurization--.

Col. 3, line 27, replace "min lute" with --minute--.

Col. 4, line 43, replace "silicate" with --silicalite--.

Col. 4, line 46, replace "silicate" with --silicalite--.

Col. 4, line 49, replace "silicate" with --silicalite--.

Col. 4, line 61, replace "hydrodesuliration" with --hydrodesulfurization--

Col. 4, line 64, replace "silicate" with --silicalite--.

Col. 5, line 14, replace "silicate" with --silicalite--.

UNITED STATES PATENT AND TRADEMARK OFFICE
CERTIFICATE OF CORRECTION

PATENT NO. : 5,997,727
DATED : December 7, 1999
INVENTOR(S) : James R. Butler and Cleve Forward It is certified that error appears in the above-identified patent and that said Letters Patent is hereby corrected as shown below:

Col. 5, line 19, replace "silicate" with --silicalite--.

Col. 5, line 32, replace "hydrodesulfiffization" with --hydrodesulfurization--.

Col. 6, line 2, replace "silicate" with --silicalite--.

Col. 6, line 16, replace "silicate" with --silicalite--.

Col. 6, line 18, replace "silicate" with --silicalite--.

Col. 6, line 20, replace "silicate" with --silicalite--.

Col. 6, line 22, replace "silicate" with --silicalite--.

Col. 6, line 26, replace "silicate" with --silicalite--.

UNITED STATES PATENT AND TRADEMARK OFFICE
CERTIFICATE OF CORRECTION

PATENT NO. : 5,997,727
DATED : December 7, 1999
INVENTOR(S) : James R. Butler and Cleve Forward It is certified that error appears in the above-identified patent and that said Letters Patent is hereby corrected as shown below:

Col. 6, line 28, replace "silicate" with --silicalite--.

Col. 6, line 30, replace "silicate" with --silicalite--.

Signed and Sealed this

Twelfth Day of September, 2000

Attest:

Q. TODD DICKINSON

*Attesting Officer*   *Director of Patents and Trademarks*